United States Patent Office 3,613,346
Patented Oct. 19, 1971

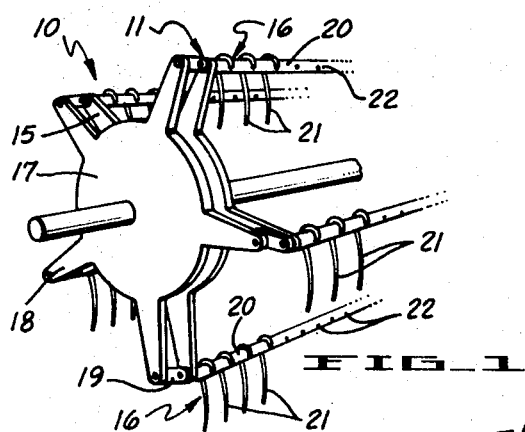
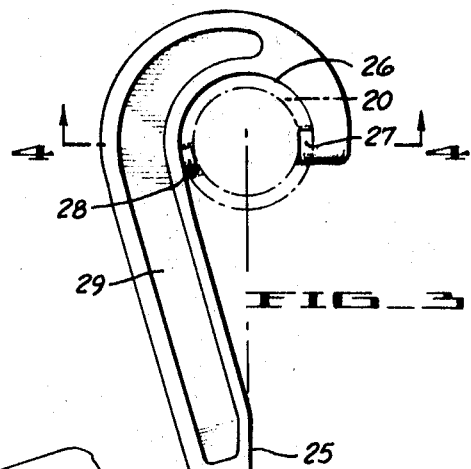
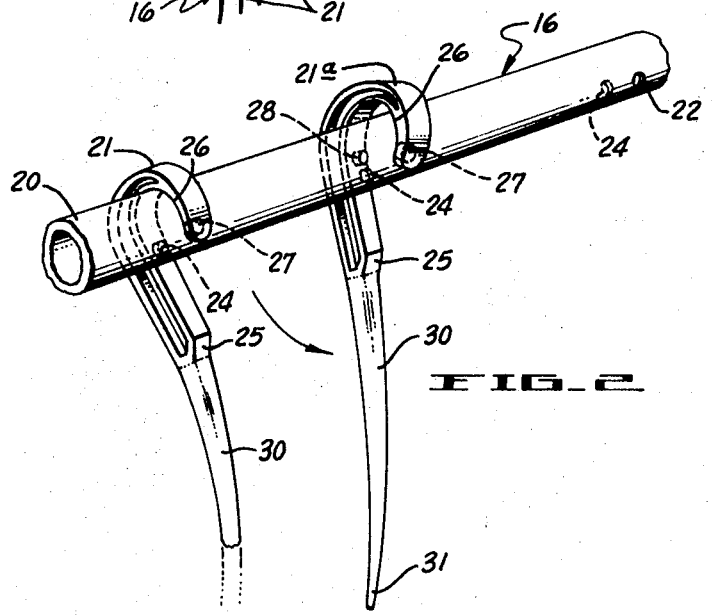
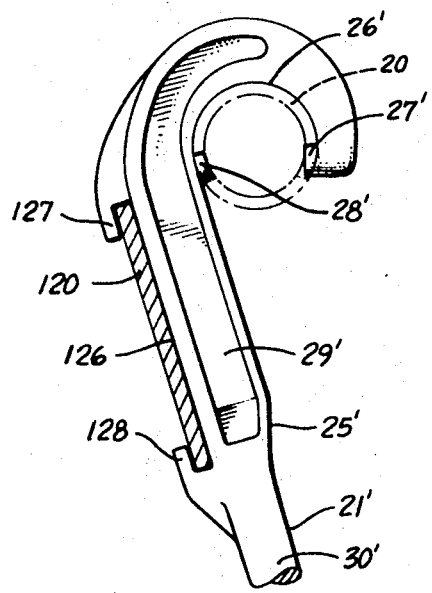
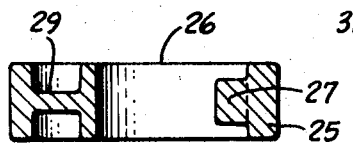
Stephen R. Hubbard
INVENTOR.

3,613,346
FINGER FOR A PICK-UP REEL
Stephen R. Hubbard, Stockton, Calif., assignor to
Universal Harvester Co., Inc., Stockton, Calif.
Filed Aug. 25, 1969, Ser. No. 852,793
Int. Cl. A01d 57/02
U.S. Cl. 56—400
8 Claims

ABSTRACT OF THE DISCLOSURE

A finger for a reel structure of the type used in swathers, combines, hay rakes, and like harvesting machinery to harvest grain and similar grass-like crops; and of the type used in harrows, scarifiers, and like cultivating machinery to work or condition the ground. The finger is mountable upon a bat bar of such reel structure, and it comprises a long stem equipped at one end with an attachment element defining a stiff resilient clamp adapted to grip a bat bar and having lugs cooperative therewith to confine the finger thereon.

---

This invention relates generally to grain (and grass)-harvesting and ground-cultivating machinery and, more particularly, to the outwardly projecting finger components of the reel structures used in swathers, combines, hay rakes, and like harvesting machinery and in harrows, scarifiers, and like cultivating machinery.

Machinery of the type being considered typically includes relatively large reel structures that are horizontally disposed and as such machines move through a field, the reels are rotatably driven to gather the growing crop (and feed it to a cutter bar, for example) in the case of harvesting machinery or to engage and disturb the ground in the case of cultivating machinery. These reel structures may be of different types but are generally similar in a mecharnical sense, and considering a pick-up reel as a typifying example, it is provided with an elongated center shaft supported for rotation about the longitudinal axis thereof and equipped radially outwardly therefrom with a plurality of angularly spaced bat assemblies having outwardly projecting fingers maintained in a generally vertical orientation as the reel structure rotates about its horizontally disposed, longitudinal axis. During such rotation, the finger-equipped bat assemblies successively sweep downwardly into the crop to gather the same and urge it through the reel and against the cutter bar which severs the crop close to the ground.

Such reel structures vary substantially in length since no single size or length satisfies the harvesting requirements of different users and, as a consequence, manufacturers and suppliers of such reel structures have been required in the past to stock a great variety of sizes which has resulted in considerable inventory expense and often causes inconvenience when a particular size required by a user was not available. In view of this, modular reel structures have been developed to enable reels of various lengths to be quickly and easily assembled so as to satisfy the size request of various users without the necessity of inventorying vast stocks of reel structures of such various lengths; and a particular example of a modular reel structure is disclosed in the commonly assigned co-pending patent application of Charles M. Gibson, Ser. No. 807,031, filed Mar. 13, 1969, now Pat. No. 3,550,366, Dec. 29, 1970.

Although the present invention is useful with reel structures whether of fixed length or of modular construction, it is especially useful with the latter because it increases the versatility thereof and thereby contributes to the advantages of modular construction. In general then, it may be said that an object of the present invention is to provide an improved finger for reel structures and the like of the type used in association with harvesting and cultivating machinery.

Further objects, among others, of the present invention are to provide an improved finger for pick-up reels and the like which is removably mountable thereon; is quickly and easily attached to the bat bar of such reel and detached therefrom all without the use of special tools and equipment and, at least in certain instances, without requiring the disassembly of any components of the reel or bat bar and without disturbing other fingers that may be mounted thereon; that has no moving parts or elements and does not require the use of screws or other similar fasteners to removably secure it to a bat bar; that can be used with bat bars of different types; and that has an over center resilient or spring-like clamping action to effect securance of the finger to one form of bat bar associated therewith.

In general terms, the finger of the present invention is a longitudinally extending component having a base or attachment section at one end thereof and an elongated stem extending therefrom. The attachment element is provided therealong with a clamp component defining a recess open along one side so as to seat a bat bar therein. Adjacent such recess, the attachment element is equipped with a pair of retaining lugs adapted to cooperatively engage the bat bar in confining the finger thereon. In the case of the bat bar being a cylindrical tube and the recess being semicircular, the lugs are angularly spaced by a distance somewhat greater than 180° in one angular direction (and therefore less than 180° in the opposite angular direction) so as to provide an over center locking of the finger upon the bat bar, the finger being sufficiently stiff and spring-like or resilient to maintain it in tight engagement with the bat bar and to resist inadvertent dislodgement of the finger therefrom.

A number of additional objects and advantages of the invention, especially as concerns particular features and details thereof, will become apparent as the specific embodiment of the invention is described that is illustrated in the accompanying drawing in which:

FIG. 1 is a broken perspective view of a pick-up reel embodying the present invention;

FIG. 2 is a greatly enlarged broken perspective view showing a single bat bar having fingers mounted thereon;

FIG. 3 is a further enlarged side view in elevation of one of the fingers;

FIG. 4 is a transverse sectional view taken along the line 4—4 of FIG. 3; and

FIG. 5 is a broken side view in elevation of a modified finger shown mounted upon a bat bar, illustrated in section, of different type.

The typifying reel structure illustrated in part in FIG. 1 is a pick-up reel denoted in its entirety with the numeral 10, and it may comprise a plurality of modules of sections a portion of one of which is shown and is designated with the numeral 11. As indicated hereinbefore, the pick-up reel structure 10 is intended to traverse a field having a crop ready to be harvested and, accordingly, the reel must be attached to or comprise a part of a vehicle operative to propel it about the field. Concerning such vehicle and the relationship of the reel structure thereto, both may be conventional and for purposes of specific identification and description, details pertinent thereto appear in the commonly assigned co-pending patent application of Thomas O'D. Connolly, Ser. No. 528,146, filed Feb. 16, 1966, now abandoned and filed as a continuation in patent application No. 820,683, filed Apr. 30, 1969, now Pat. No. 3,546,863, Dec. 15, 1970.

The reel structure 10 includes a longitudinally extending center shaft 12 which may comprise a plurality of interconnected sections respectively associated with the modules 11. Mounted upon the center shaft 12 so as to rotate therewith are a plurality of drive spiders 14 each of which consitutes a substantially planar plate or disc of generally cylindrical configuration equipped with angularly spaced, radially extending arms 15 integrally or otherwise fixedly related thereto. In the specific reel structure shown, each of the drive spiders 14 is equipped with five radially extending arms 15 angularly spaced from each other by equal distances of 72° from center-to-center. It will be appreciated that the radially extending arms 15 of all of the drive spiders 14 comprised by the reel structure 10 must be respectively aligned in an axial sense along the reel structure so that each successive pair of aligned arms can support a bat assembly 16 therebetween.

Each bat assembly is supported by the arms 15 associated therewith for rotational movement with respect thereto for the purpose of enabling the bat assembly to maintain a predetermined orientation (generally vertical) as the reel structure 10 and drive spiders 14 thereon rotate about the longitudinal axis of the center shaft 12. As respects the present invention, any suitable means may be employed to effect such rotational support of each bat assembly relative to the radial arms 15 associated therewith, and a specific example thereof is disclosed in the aforementioned co-pending application Ser. No. 807,031, filed Mar. 13, 1969. Also as explained in such co-pending application, control spiders 17 are provided at the ends of the reel structure 10, and each control spider is provided with a plurality of radially extending arms 18 corresponding in number to the number of arms 15 of the drive spiders 14 which, in the particular reel structure 10 being considered, constitutes five angularly spaced arms in each instance.

Each arm 18 of the control spider 17 is connected through a linkage 19 to the associated bat assembly 16 so as to effect rotation thereof relative to the drive spiders as the reel structure 10 is rotatably driven, thereby maintaining the bat assemblies in a generally vertical orientation at all times as the reel structure traverses an arcuate path of 360°. As explained in the aforementioned co-pending patent application Ser. No. 528,146, the control spider 17 is usually adjustable so that the orientation of the bat assemblies 16 can be changed slightly to assure their most efficient coaction with the particular crop being harvested by the reel structure.

As shown in FIGS. 1 and 2, each bat assembly 16 includes a bat bar 20 having a plurality of pick-up fingers 21 mounted thereon. In the form illustrated in FIGS. 1–3, the bat bar 20 is an elongated cylindrical tube having a hollow interior which reduces the weight of each bat bar and, therefore, the weight of the reel structure 10. The bar 20 is provided with two apertures or recesses 22 and 24 associated with each of the fingers 21 and, as seen in FIG. 3, the recesses are angularly displaced from each other by a distance somewhat in excess of 180° in one direction. In the particular combination of bar 20 and finger 21 shown, the angular displacement approximates 195° center-to-center in a counterclockwise direction as viewed in FIG. 3. It will be appreciated that in the case of the bar 20 being solid in cross section or having relatively thick wall structure, the recess 22 and 24 would usually be closed at their inner ends.

Each of the fingers 21 includes a base or attachment element 25 adjacent the bar 20, and the element 25 is equipped at one end thereof with an arcuate generally C-shaped clamp 26 open along one side so as to seat the bar 20 therein. The clamp 26 is provided with a pair of inwardly projecting lugs 27 and 28 respectively adapted to seat within any pair of recesses 22 and 24 at any particular location along the bar 20. The base element 25 at one end terminates adjacent the lug 27, and adjacent the lug 28 the element continues along a tangent to the bar 20, as is evident in FIG. 3. As seen in FIG. 4, the base element 25 may have the general configuration of an I-beam which conserves material and reduces weight by minimizing the mass of material along the web section 29 of such I-beam where the excess mass or material does not contribute significantly to the strength of the section thereat.

The base element 25 at the end thereof remote from the clamp 26 is equipped with an elongated stem 30 that extends axially therefrom and has a somewhat curvilinear configuration terminating in a free outer end 31. The stem 30 is such that it traverses an imaginary line 32 become progressively smaller toward the outer terminus 31 from the root end of the stem adjacent the base element 25 to which it is fixedly secured. It will be observed in FIG. 3 that the generally arcuate configuration of the stem 30 is such that it transverses an imaginary line 32 extending from the geometric center of the C-shaped clamp 26 (i.e. the center of the cylindrical bar 20) to the center of the free end 31 of the stem.

More particularly in this respect, the stem 30 in the orientation thereof shown in FIG. 3 bows or extends forwardly from the base element 25 so as to gradually cut through the line 32, and after completely passing therethrough, the stem sweeps rearwardly so as to again engage the line 32 and terminate thereon at its free end 31. Thus, the stem 30 has a slight bow along its length that is effective to resist flexure of any significance as the finger is rotated downwardly and into engagement with the ground surface or with a grain or grass to be delivered to a cutting bar by the reel structure 10. It should be noted that in the general disposition of the finger 21 as shown in both FIGS. 2 and 3, the direction of rotation of the reel structure 10 would be such that the pick-up fingers tend to move from right to left in a clockwise direction as seen in these figures.

The fingers 21 may be formed from a variety of materials that are relatively stiff so as to enable the fingers to engage and scarify or harrow or otherwise cultivate the ground, or to engage and gather the grain or grass as the reel structure rotates. At the same time, however, such material has a degree of resilience sufficient to permit the finger to be removably mounted upon the bat bar. Accordingly, the finger 21 may be formed of spring steel or some other metal or metal alloy selected to have requisite characteristics, but it can be fabricated advantageously by conventional molding technique from various synthetic plastic materials such as nylon, for example, having the degree of stiffness and resilience required. In the usual instance, the finger 21 will be integral from end to end thereof although it will be apparent that the finger might be subdivided into one or more individual components integrated or united subsequent to their fabrication.

In mounting a finger 21 upon a bat bar 20, the lug 27 is most easily seated within a recess 22 intended therefor as shown generally in FIG. 2 by the finger 21a. The interconnection of the lug 27 with the edges of the recess 22 constrains the lug and adjacent end portion of the clamp 26 against displacements relative to the bar 20 as the clamp is pressed or otherwise forced about the bar 20 toward the fully mounted position shown by the finger 21 in FIG. 2. As the clamp 26 is thusly stretched about the bar 20, the entire clamp section necessarily expands by an amount substantially equal to the radial length of the lug 28. This progressive urging of the clamp 26 about the bar 20 continues until the lug 28 is in substantial alignment with the recess 24, whereupon the lug snaps thereinto because of the resilient biasing force of the clamp 26. The finger 21 is then mounted upon the bat bar 20 as shown in both FIGS. 2 and 3.

Should it be necessary or desirable to remove the finger 21 from the bar 20, the finger is grasped adjacent the root of the stem 30 and end portion of the base 25 adjacent thereto and is pivoted outwardly generally about the interconnection of the lug 27 with its recess 22 so as to withdraw the lug 28 from the recess 24. The finger is then urged in the angular direction opposite to that used in mounting the fingers upon the bar until the finger is completely free therefrom and generally has the position illustrated by the finger 21a in FIG. 2, whereupon the finger can be removed completely from the bar.

Each pairs of lugs 27 and 28 and recesses 22 and 24 respectively seating the same therein are aligned in a plane normal to the axis of the bat bar 20, and they define an overcenter interconnection between each finger and bat bar so as to positively constrain the finger thereon during use of the reel structure 10. Observing FIG. 3 in particular, it will be evident that as the finger 21 sweeps generally in a clockwise direction during use of the reel structure 10, the external forces exerted against the finger tending to resist or prevent movement thereof will be generally directed from left to right, thereby tending to prevent such sweeping movement of the fingers. The net effect is that the base 25 adjacent the lug 28 will be pressed more tightly against the bar 20 and any propensity toward relative angular displacement between the finger and bar will be in a direction tending to displace the finger in a counterclockwise direction with respect to the bar. As a consequence, the tendency toward relative movement is effectively resisted by the lugs 27 and 28 in cooperation with the recesses 22 and 24 in which they respectively seat.

The lugs 27 and 28 (and recesses 22 and 24) are of different diameters with the lug 27 being substantially larger than the lug 28. In this reference the lug 27 tends to define the pivot point about which relative displacements of the finger 21 and bat bar occur, and the greater mass of this lug is most effectively utilized in resisting any such relative displacements. The smaller lug 28 tends to constitute an overcenter locking device in association with its recess 24 and may be somewhat smaller without the reduction in material mass creating the likelihood of breakage. In any case the differences in diameters of the lugs and recesses results in a polarizing means permitting the finger 21 to be mounted upon the bat bar 20 in only one orientation (top to bottom as viewed in FIG. 3). The asymmetrical spacing between the lugs and recesses contributes to this polarizing arrangement by preventing reversal of the finger (front to rear as viewed in FIG. 3).

The finger 21 is quickly and easily mounted upon and removed from the bat bar 20 and therefore lends itself to modular reel constructions having the advantages indicated hereinbefore. When once properly mounted upon the bat bar 20, the finger 21 remains firmly in position thereon being constrained by the overcenter configuration, yet is readily removed should a finger be broken or otherwise require replacement.

A modified finger 21' is shown in FIG. 5 and it is provided with a second clamp 126 disposed along the attachment element 25' (the primed form of the same numerals are used to identify the components respectively corresponding to the components in the finger 21) on the side thereof opposite the clamp 26'. The clamp 126 defines a recess of generally rectangular configuration adapted to seat a bat bar 120 therein which is generally rectangular in cross section, as is evident in FIG. 5. The clamp 126 is also provided with a pair of inwardly extending lugs 127 and 128 that are adapted to cooperatively engage the bat bar 120 so as to confine the finger 21' thereon.

The frictional grip established between the clamp 126 and bat bar 120 is ordinarily adequate to prevent inadvertent relative displacements therebetween, but should a greater inhibition to relative movement be desired, additional locking means can be employed as, for example, screw type fasteners interconnecting the bat bar and finger, and recesses or channels formed in the bat bar and within which the lugs 127 and 128 seat. Further, should polarization be desired, the lugs 127 and 128 can be of different sizes as explained hereinbefore in connection with the aforementioned lugs 27 and 28. It might be observed that the most convenient manner of mounting each finger 21' upon the bat board 120 is to displace the finger longitudinally along the bat bar because of the considerable stiffness of the finger particularly along the I-beam section 29' thereof adjacent the clamp 126.

While in the foregoing specification and embodiment of the invention has been disclosed in considerable detail for purposes of making a complete disclosure thereof, it will be apparent to those skilled in the art that numerous changes may be made in such details without departing from the spirit and its principles of the invention.

What is claimed is:

1. A finger for a harvesting reel or the like, comprising an attachment element equipped along one side thereof with a first resilient clamp defining a generally continuous arcuate recess open along its under side to enable a support for said finger to be seated therein, said clamp having a pair of inwardly projecting angularly spaced apart lugs cooperative with such support to confine said finger thereon, and a stem fixedly connected to said attachment element and extending from an end portion thereof, said lugs being respectively disposed along the front and rear portions of said recess and adapted to seat within openings provided therefor in such support.

2. The finger of claim 1 in which said lugs have an asymmetrical angular spacing therebetween somewhat less than 180° in one angular direction and slightly greater in 180° in the opposite direction.

3. The finger of claim 1 in which said lugs are of different size to enforce polarization upon said finger.

4. The finger of claim 1 in which said stem is axially elongated and curvilinear along the length thereof and provides an outer free end terminating on a line from the approximate center of said recess and traversing said stem generally adjacent the juncture thereof with said attachment element.

5. The finger of claim 1 in which said attachment element is equipped with a second resilient clamp along the opposite side thereof defining a generally rectangular recess open along one side and having a pair of inwardly projecting lugs, the first of said clamps being generally C-shaped and the second clamp being adapted to seat within the recess thereof a support of generally rectangular cross section.

6. The finger of claim 5 in which said stem is axially elongated and curvilinear along the length thereof and provides an outer free end terminating on a line having its origin at the approximate center of the recess defined by said C-shaped clamp and traversing said stem generally adjacent the juncture thereof with said attachment element.

7. The combination of claim 6 in which said C-shaped clamp is generally circular and the lugs associated therewith are of different size and have an asymmetrical angular spacing therebetween approximating 180°.

8. The finger of claim 1 in combination with a hollow cylindrical support having said openings therein, said openings being a pair of angularly spaced openings of different size and of asymmetrical spacing therebetween somewhat less than 180° in one angular direction and slightly greater than 180° in the opposite direction, said finger being integral throughout and seating said support within said recess with said lugs being disposed within said openings.

(References on following page)

References Cited

UNITED STATES PATENTS

| | | | |
|---|---|---|---|
| 2,514,560 | 7/1950 | Scranton | 56—400 |
| 2,608,045 | 8/1952 | Keene | 56—400 |
| 2,608,046 | 8/1952 | Best | 56—400 |
| 2,713,241 | 7/1955 | West | 56—400 |
| 3,061,995 | 11/1962 | Stone | 56—400 X |
| 3,066,470 | 12/1962 | Johnston | 56—400 |

FOREIGN PATENTS

| | | | |
|---|---|---|---|
| 985,959 | 3/1965 | Great Britain | 56—400 |

LOUIS G. MANCENE, Primary Examiner

J. A. OLIFF, Assistant Examiner

U.S. Cl. X.R.

24—257 R